United States Patent
Yao et al.

(10) Patent No.: US 10,172,074 B2
(45) Date of Patent: Jan. 1, 2019

(54) WIRELESS LOCAL AREA NETWORK, STATION, AND ACCESS POINT AND METHODS FOR ACCESSING THEREOF

(71) Applicant: Huawei Technologies Co., LTD, Shenzhen (CN)

(72) Inventors: Zongming Yao, Chengdu (CN); Philip Barber, Shenzhen (CN); Xuehuan Wang, Chengdu (CN)

(73) Assignee: Huawei Technologies Co. Ltd., Shenzhen (CN)

( * ) Notice: Subject to any disclaimer, the term of this patent is extended or adjusted under 35 U.S.C. 154(b) by 399 days.

(21) Appl. No.: 13/911,390

(22) Filed: Jun. 6, 2013

(65) Prior Publication Data
US 2013/0272289 A1    Oct. 17, 2013

Related U.S. Application Data

(63) Continuation of application No. PCT/CN2012/077501, filed on Jun. 26, 2012.

(30) Foreign Application Priority Data

Nov. 1, 2011  (CN) .......................... 2011 1 0339998

(51) Int. Cl.
*H04W 48/16* (2009.01)
*H04W 48/14* (2009.01)
(Continued)

(52) U.S. Cl.
CPC ........... *H04W 48/16* (2013.01); *H04W 48/14* (2013.01); *H04W 48/12* (2013.01); *H04W 48/20* (2013.01); *H04W 84/12* (2013.01)

(58) Field of Classification Search
CPC ..... H04W 48/16; H04W 48/14; H04W 48/18; H04W 84/12; H04W 76/02; H04W 68/00;
(Continued)

(56) References Cited

U.S. PATENT DOCUMENTS

2006/0089127 A1    4/2006  Muratsu
2008/0151796 A1    6/2008  Jokela
(Continued)

FOREIGN PATENT DOCUMENTS

CN    101179423 A    5/2008
CN    101516118 A    8/2009
(Continued)

OTHER PUBLICATIONS

English Translation—Du Yuesheng, ZTE Corporation, Data communication method, Aug. 26, 2009, Patent Publication No. CN 101516118, http://www.google.com/patents/CN101516118.*
(Continued)

*Primary Examiner* — Candal Elpenord
*Assistant Examiner* — Ricardo H Castaneyra
(74) *Attorney, Agent, or Firm* — Slater Matsil, LLP

(57) ABSTRACT

Embodiments of the present invention provide a method for accessing a wireless local area network, a station, and an access point. The method includes: receiving, by a station, a beacon or a probe response from an access point, where the beacon or the probe response carries configuration version information; and executing, by the station, a GAS query according to the configuration version information carried in the beacon or the probe response. In the embodiments of the present invention, the access point sends the configuration version information to the station, so that the station executes the GAS query according to the configuration version information, thereby improving access efficiency.

20 Claims, 11 Drawing Sheets

(51) Int. Cl.
  *H04W 84/12* (2009.01)
  *H04W 48/12* (2009.01)
  *H04W 48/20* (2009.01)
(58) Field of Classification Search
  CPC ..... H04W 12/06; H04W 48/20; H04W 48/12; H04W 24/02; H04W 52/0209; H04W 48/02; H04W 48/08; H04W 76/10; H04W 88/08; H04W 36/0061; H04L 43/04; H04L 67/16
  USPC .................................. 370/338, 254, 328, 311
  See application file for complete search history.

(56) References Cited

U.S. PATENT DOCUMENTS

| | | | |
|---|---|---|---|
| 2009/0010399 A1* | 1/2009 | Kim et al. | 379/45 |
| 2009/0177759 A1 | 7/2009 | Ogawa et al. | |
| 2010/0052889 A1 | 3/2010 | Shu | |
| 2011/0113252 A1* | 5/2011 | Krischer et al. | 713/175 |
| 2011/0149938 A1 | 6/2011 | Bajko | |
| 2012/0017267 A1* | 1/2012 | McCann et al. | 726/5 |
| 2012/0076117 A1* | 3/2012 | Montemurro et al. | 370/338 |
| 2012/0246468 A1* | 9/2012 | Gabor | 713/156 |
| 2012/0281609 A1* | 11/2012 | Kasslin et al. | 370/312 |

FOREIGN PATENT DOCUMENTS

| | | |
|---|---|---|
| CN | 102100111 A | 6/2011 |
| EP | 2161954 A1 | 3/2010 |
| JP | 2006121576 A | 5/2006 |
| JP | 2007013649 A | 1/2007 |
| JP | 2009159324 A | 7/2009 |
| JP | 2010118043 A | 5/2010 |
| JP | 2011135325 A | 7/2011 |
| JP | 2013522999 A | 6/2013 |
| WO | 2008096199 A2 | 8/2008 |
| WO | 2011056272 A1 | 5/2011 |
| WO | 2011114273 A1 | 9/2011 |
| WO | 2013183931 A1 | 12/2013 |

OTHER PUBLICATIONS

IEEE Standard for Information technology—Telecommunications and information exchange between systems—Local and metropolitan area networks—Specific requirements, Part 11: Wireless LAN Medium Access Control (MAC) and Physical Layer (PHY) Specifications, IEEE Computer Society, IEE Std 802.11, New York, NY, Jun. 12, 2007, 1232 pages.

IEEE Standard for Information technology—Telecommunications and infrmation exchange between systems—Local and metropolitan area networks—Specific requirements, Part 11: Wireless LAN Medium Access Control (MAC) and Physical Layer (PHY) Specification, Amendment 9: Interworking with External Networks, IEEE Computer Society, IEEE Std 802.11u, New York, NY, Feb. 25, 2011, 208 pages.

International Search Report received in Application No. PCT/CN2012/077501 dated Oct. 18, 2012, 13 pages.

Barber, et al., "GAS Version Control in 11ai," IEEE 802.11-11/1498-01-00ai, Oct. 2011, 16 pages.

* cited by examiner

WIRELESS LOCAL AREA NETWORK, STATION, AND ACCESS POINT AND METHODS FOR ACCESSING THEREOF

CROSS-REFERENCE TO RELATED APPLICATIONS

This application is a continuation of International Application No. PCT/CN2012/077501, filed on Jun. 26, 2012, which claims priority to Chinese Patent Application No. 201110339998.4, filed on Nov. 1, 2011, both of which are hereby incorporated by reference in their entireties.

TECHNICAL FIELD

Embodiments of the present invention relate to the field of wireless communications, and in particular, to wireless local area network, a station, and an access point and methods for accessing thereof.

BACKGROUND

IEEE (Institute of Electrical and Electronics Engineers, institute of electrical and electronics engineers) 802.11u is a supplementary standard stipulated for IEEE 802.11. The main research content of the IEEE 802.11u standard is a function of a WLAN (Wireless Local Area Network, wireless local area network) interworking with an external network (Interworking with External Networks). The function allows a STA (Station, station) to obtain service access of the external network. The external network is an external network that is subscribed to or has other features. For example, the STA may obtain a subscription service provided by a subscription service provider network (SSPN, Subscription service provider network).

An interworking element (Interworking element) is newly added to the IEEE 802.11u standard to serve as a carrier of capabilities and information of interworking between an AP (Access Point, access point) and the STA, so as to implement interworking between a WLAN infrastructure network and an external network. In addition, a roaming consortium information element (Roaming Consortium information element) is also newly added to the IEEE 802.11u standard to indicate identification information of a related subscription service provider (SSP, Subscription Service Provider), and the AP transmits the element, which helps to quickly start authentication of security credentials. Specifically, the AP sends a beacon (Beacon) and a probe response (Probe response) that contain the interworking element and the roaming consortium information element to assist the STA in network selection.

If the interworking element appears in the beacon and the probe response, it indicates that the STA supports the GAS (Generic Advertisement Services, generic advertisement services) protocol. GAS can facilitate the network selection of the STA. No matter whether the STA is in an associated state or in a non-associated state, GAS can provide a transmission mechanism for advertisement services, to implement a network discovery and selection function. A query request STA and a query response AP implement a GAS query through an interaction frame. Specifically, in a synchronous query state, first, the query request STA sends a GAS initial request frame to the query response AP and requires the query response AP to feedback expected query information; after receiving the request, the query response AP uploads the query request information to an advertisement server (Advertisement Server) and requires the advertisement server to feedback corresponding query information; the advertisement server feeds back the corresponding query information; and finally, the query response AP feeds back the fed back query information to the query request STA by using a single GAS initial response frame or one or more GAS recovery response frames as a carrier. Which carrier is adopted is related to the size of the query information. If the length of the query information is too long, the query information is fragmented, and after receiving the GAS initial response frame, the query request STA may continue to send a GAS recovery request frame to request obtaining of subsequent fragments. In an asynchronous query state, first, the query request STA sends a GAS initial request frame to the query response AP and requires the query response AP to feed back expected query information; after receiving the request, the query response AP uploads the query request information to the advertisement server and requires the advertisement server to feed back corresponding query information; then, the query response AP sends a GAS initial response frame which does not contain the query information to the query request STA and instructs the query request STA to get the query information after a period of time; the advertisement server feeds back the corresponding query information; after the time designated by the AP, the query request STA returns the query information to the AP through a recovery request frame; and finally, the query response AP feeds back the fed back query information to the query request STA by using a single GAS recovery response frame or one or more GAS recovery response frames as a carrier. Which carrier is adopted is related to the size of the query information. If the length of the query information is too long, the query information is fragmented, and after receiving the GAS recovery response frame, the query request STA may continue to send a GAS recovery request frame to request obtaining of subsequent fragments.

In an existing 802.11u mechanism, assuming a STA obtains, through a GAS query process, information of an external network supported by AP1 and is successfully associated with AP1, then, the STA is disassociated from AP1 for a certain reason (for example, the STA is taken to an area covered by AP2 and is associated with the new AP2 for communication, or the STA actively switches to a non-WLAN network for communication without departing from the coverage of AP1), and the STA needs to re-establish the association with AP1 for a certain reason (for example, the STA is taken back to the area covered by AP1, or the STA actively switches back to the WLAN network for communication without departing from the coverage of AP1) after a period of time, the STA needs to re-obtain, through the GAS query process, the information of the external network supported by AP1, so as to become associated with AP1 again.

It can be seen that, in the existing 802.11u mechanism, even if the information of the external networks remains the same all the time, every time the STA establishes the association with AP1, the STA needs to re-obtain, through the GAS query process, the information of the external network supported by the AP1. This process has a low efficiency, and is time-consuming and power-consuming, thereby affecting user experience of the STA.

SUMMARY OF THE INVENTION

Embodiments of the present invention provide a method for accessing a wireless local area network, a station, and an access point, which can solve a problem that access efficiency is reduced as a GAS query process is performed repeatedly.

In one aspect, a method for accessing a wireless local area network is provided, including: receiving, by a station, a beacon or a probe response from an access point, where the beacon or the probe response carries configuration version information; and executing, by the station, a GAS query according to the configuration version information carried in the beacon or the probe response.

In another aspect, a method for accessing a wireless local area network is provided, including: sending, by an access point, a beacon or a probe response to a station, where the beacon or the probe response carries configuration version information, so that the station executes a GAS query according to the configuration version information carried in the beacon or the probe response.

In another aspect, a station is provided, including: a receiving unit, configured to receive a beacon or a probe response from an access point, where the beacon or the probe response carries configuration version information; and an executing unit, configured to execute a GAS query according to the configuration version information carried in the beacon or the probe response.

In another aspect, an access point is provided, including: a generating unit, configured to generate a beacon or a probe response, where the beacon or the probe response carries configuration version information; and a sending unit, configured to send, to a station, the beacon or the probe response generated by the generating unit, so that the station executes a GAS query according to the configuration version information carried in the beacon or the probe response.

In the embodiments of the present invention, the access point sends the configuration version information to the station, so that the station executes the GAS query according to the configuration version information, thereby improving the access efficiency.

BRIEF DESCRIPTION OF THE DRAWINGS

To illustrate the technical solutions in the embodiments of the present invention more clearly, the following briefly introduces accompanying drawings required for describing the embodiments. Apparently, the accompanying drawings in the following description merely show some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are merely part rather than all of the embodiments of the present invention. All other embodiments obtained by a person of ordinary skill in the art based on the embodiments of the present invention without creative efforts shall fall within the protection scope of the present invention.

Figure 1:
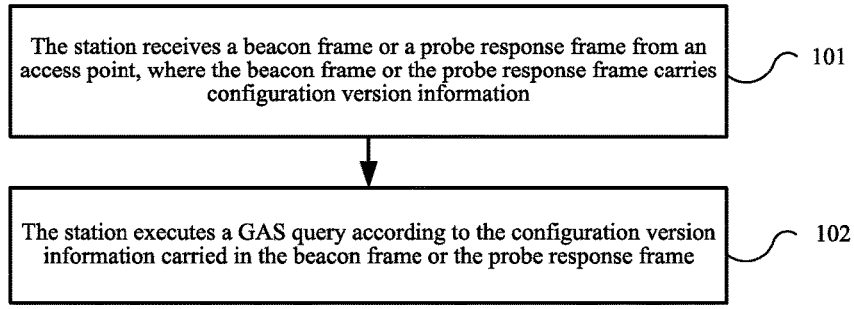
FIG. 1 is a flow chart of a method for accessing a wireless local area network according to an embodiment of the present invention.

FIG. 1 is a flow chart of a method for accessing a wireless local area network according to an embodiment of the present invention. The method in FIG. 1 is executed by a station.

101: The station receives a beacon or a probe response from an access point, where the beacon or the probe response carries configuration version information.

102: The station executes a GAS query according to the configuration version information carried in the beacon or the probe response.

Optionally, as an embodiment, the station does not execute the GAS query when the configuration version information carried in the beacon or the probe response is consistent with configuration version information included in an association record stored by the station.

Optionally, as another embodiment, the station executes the GAS query when the configuration version information carried in the beacon or the probe response is not consistent with the configuration version information included in the association record stored by the station.

Optionally, as another embodiment, after receiving the beacon or the probe response, the station determines whether the configuration version information carried in the beacon or the probe response is consistent with the configuration version information included in the association record stored by the station.

Optionally, as another embodiment, the association record may be pre-stored. For example, the station may store an association record for the access point, where the association record includes configuration version information of the access point and GAS query information of the access point that is obtained from an advertisement server in a previous GAS query process.

For example, during re-association, if the configuration version information carried in the beacon or the probe response is consistent with the configuration version information included in the association record, the station does not execute the GAS query, and directly creates an association request according to the association record and sends the association request to the access point. When the association request is created, the GAS query information included in the foregoing association record may be used. In addition, when the GAS query needs to be executed in other cases, the station may also not execute the GAS query and directly use already stored GAS query information when the configuration version information carried in the beacon or the probe response is consistent with the configuration version information included in the association record.

Time when the association record is stored is not limited in the embodiment of the present invention. For example, the association record may be established and stored after the GAS query information is obtained. Optionally, as an embodiment, the station may store the record for the access point after being successfully associated with the access point.

GAS query information of the access point obtained from the advertisement server in a GAS query process is similar to that in the prior art, and therefore is not described in detail again. For example, the GAS query information may include a roaming consortium list, that is, other OIs (Organizational Identifier, organizational identifier) that are not contained in a roaming consortium information element of the beacon; or the GAS query information may include an NAI (Network Access Identifier, network access identifier) realm list. The list may indicate that a hotspot can accept security certificates of these realms (realm), where these realms aim at a hotspot operator or a roaming partner of the hotspot operator. The list further provides a supported EAP (Extensible Authentication Protocol, extensible authentication protocol) type.

Optionally, as another embodiment, the association record may further include configuration information on the access point. The configuration information on the access point may include a wireless local area network parameter, a vendor specific parameter, or another parameter (for example, a parameter related to security authentication). For example, the wireless local area network parameter configured on the access point may be a parameter related to a specific protocol (for example, 802.11u), for example, information carried in an interworking element and a roaming consortium information element. In addition, the vendor specific parameter configured on the access point may be information carried in a vendor specific information (Vendor Specific Information) information element (the information element may be located in the beacon or the probe response).

Optionally, as an embodiment, the configuration version information may include a configuration change counter used to indicate a change of the configuration information on the access point and/or of configuration information on the advertisement server, or a configuration version string used to indicate a version of the configuration information on the access point and/or of the configuration information on the advertisement server. Example structures of the configuration version information will be described in detail in the following with reference to accompanying drawings.

Optionally, as another embodiment, when obtaining updated GAS query information (for example, in a re-association process or in another GAS query process), the station may perform addition or update on the association record according to the updated GAS query information.

In the embodiment of the present invention, the access point sends the configuration version information to the station, so that the station executes the GAS query according to the configuration version information without repeating execution of the GAS query every time, thereby reducing unnecessary GAS query processes and improving access efficiency.

The beacon or the probe response may carry identification information of the access point, and the association record may also include the identification information of the access point.

It should be noted that, a specific form of the identification information is not limited in the embodiment of the present invention. For example, a MAC (Media Access Control, media access control) address of the access point may be used as the identification information of the access point. A MAC address can uniquely identify each access point. Previously stored GAS query information of a same AP is used in subsequent association, which can improve the access efficiency.

Alternatively, identification information of a group to which the access point belongs, for example, an SSID (Service Set Identification, service set identification), may be used. The SSID can identify a service set where the access point is located. Multiple APs (for example, AP1 and AP2) in one group (for example, a service set) generally have association with each other, for example, belong to a same operator, and may use same association information/ GAS query information. In this case, GAS query information of an access point AP1 previously stored by the STA can also be used during association with AP2, and it is not necessary to perform a GAS query through AP2, thereby further improving the access efficiency.

As another embodiment, identification information in other forms may be used, for example, identification information indicating a region where the access point is located. In a same region, multiple APs may use same association information. In this case, if during association with one AP, previously stored GAS query information about another AP can be used, the access efficiency can also be improved.

The identification information may be notified to the STA through the beacon or the probe response, or notified in other manners, which is not limited in the embodiment of the present invention.

In addition, the association record in the embodiment of the present invention may include GAS query information obtained from the advertisement server during initial association with the access point, but the embodiment of the present invention is not limited thereto. For example, the association record may also include GAS query information obtained from the advertisement server after successful association (initial association or subsequent association/re-association), for example, cross-network roaming information.

For example, assuming when being initially associated with an AP, the STA obtains GAS query information of the AP through a GAS query and records the GAS query information in an association record. Afterwards, the STA needs to execute the GAS query the AP again for a certain reason (no matter whether the STA has been successfully associated with the AP or not at this time), the STA may supplement/update the original association record with newly obtained GAS query information, or add a new association record to record the newly obtained GAS query information.

Figure 2:
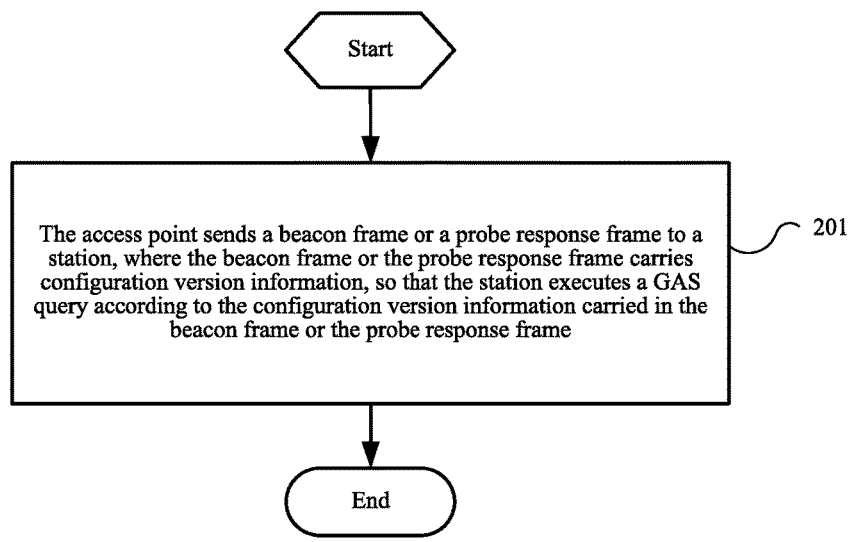
FIG. 2 is a flow chart of a method for accessing a wireless local area network according to another embodiment of the present invention.

FIG. 2 is a flow chart of a method for accessing a wireless local area network according to another embodiment of the present invention. The method in FIG. 2 is executed by an access point.

201: The access point sends a beacon or a probe response to a station, where the beacon or the probe response carries configuration version information, so that the station executes a GAS query according to the configuration version information carried in the beacon or the probe response.

Optionally, as an embodiment, the configuration version information may include a configuration change counter used to indicate a change of configuration information on the access point and/or of configuration information on an advertisement server. Alternatively, the configuration version information may include a configuration version string used to indicate a version of the configuration information on the access point and/or of the configuration information on the advertisement server.

The definition of the configuration information is described above, and therefore is not described repeatedly.

In the embodiment of the present invention, the access point sends the configuration version information to the station, so that the station executes the GAS query according to the configuration version information without repeating execution of the GAS query every time, thereby reducing unnecessary GAS query processes and improving access efficiency.

The configuration version information is used to indicate a change or a version of a configuration of the access point and/or the advertisement server, and a form of the configuration version information is not limited in the embodiment of the present invention. For example, in a case where the configuration change counter is adopted, the configuration change counter may perform a corresponding counting operation for the change of the configuration information on the access point and/or of the configuration information on the advertisement server. In addition, in a case where the configuration version string is adopted, the configuration version string may record a corresponding version string for the version of the configuration information on the access point and/or of the configuration information on the advertisement server. A structure of the configuration version information is described in the following in combination with specific examples. However, these examples are merely intended to help a person skilled in the art to better understand the embodiment of the present invention, but not to limit the scope of the present invention.

FIG. 3A to FIG. 3F are schematic diagrams of examples of configuration version information according to an embodiment of the present invention.

Usually, once configured, configuration information on the AP and configuration information maintained on the advertisement server do not change frequently, so that it is possible for the STA to reuse information obtained through a GAS query process. In view of this, a concept of version indication may be introduced to record a change of the configuration information configured on the AP and/or of the configuration information maintained on the advertisement server.

Figure 3A:
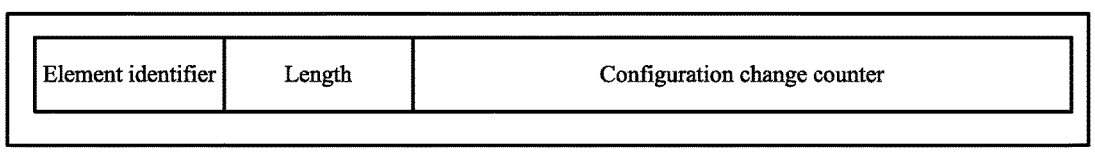
FIG. 3A to FIG. 3F are schematic diagrams of examples of configuration version information according to an embodiment of the present invention.

For example, a configuration change counter (Configuration Change Counter) shown in FIG. 3A may be defined to record the change of the configuration information on the AP and/or of the configuration information on the advertisement server. Specifically, every time either kind of the configuration information changes, 1 is added to the configuration change counter correspondingly.

In a structure of the configuration change counter shown in FIG. 3A, an element identifier (Element ID) may be any integer value, from 0 to 255, whose use has not been defined by the 802.11 protocol (for example, but not limited to, 241), and a length (Length) represents the number of bytes corresponding to the configuration change counter (for example, but not limited to, 1, 2, 4, or 8).

It should be noted that, the configuration change counter in FIG. 3A may also only record a change of one of the two kinds of configuration information.

Figure 3B:
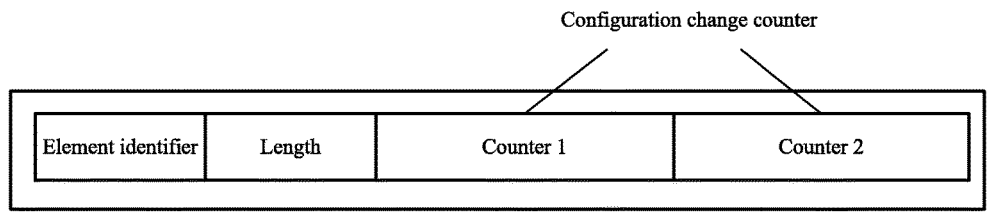

FIG. 3B shows an example of another configuration change counter. In the example of FIG. 3B, counting is performed for changes of the two kinds of configuration information. Specifically, as shown in FIG. 3B, an element identifier (Element ID) may be any integer value, from 0 to 255, whose use has not be defined by the 802.11 protocol, and a length (Length) represents the number of bytes corresponding to the configuration change counter. The configuration change counter includes two counters, namely, a counter 1 for the configuration information on the AP and a counter 2 for the configuration information on the advertisement server, to record changes of the two configurations.

It should be noted that, although FIG. 3B shows the example where the two configurations correspond to the two counters respectively, the embodiment of the present invention is not limited thereto. The configuration change counter may aim at only one of the two configurations, and the number of the corresponding counters may be reduced to one.

Figure 3C:
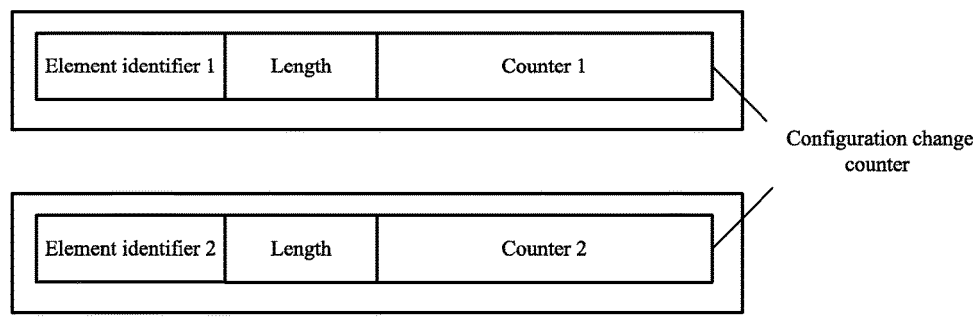

FIG. 3C shows an example of another configuration change counter. In the example of FIG. 3C, counting is still performed for changes of the two kinds of configuration information, but two elements, namely, an element identifier 1 for the configuration information on the AP and an element identifier 2 for the configuration information on the advertisement server, are used to record changes of the two configurations. The two element identifiers (Element ID) may be two different integer values, from 0 to 255, whose use has not be defined by the 802.11 protocol, and a length (Length) represents the number of bytes corresponding to corresponding counters (a counter 1 and a counter 2).

It should be noted that, although FIG. 3C shows the example where the two configurations correspond to the two elements respectively, the embodiment of the present invention is not limited thereto. The configuration change counter may aim at only one of the two configurations, and the number of the corresponding elements may be reduced to one.

A configuration version string (Configuration Version String) may also be used to record a version and a change of the configuration information on the AP and/or of the configuration information on the advertisement server in addition to that the configuration change counter may be used to record the change of the configuration information on the AP and/or of the configuration information on the advertisement server.

Figure 3D:
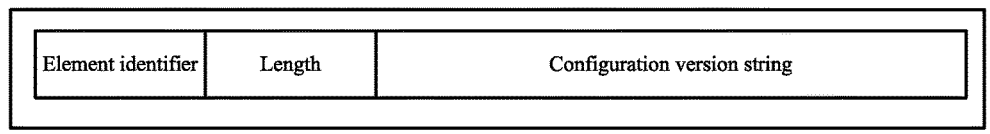

FIG. 3D shows an example of a structure of the configuration version string. An element identifier (Element ID) may be any integer value, from 0 to 255, whose use has not be defined by the 802.11 protocol (for example, but not limited to, 242), and a length (Length) represents the number of bytes corresponding to the configuration version string.

It should be noted that, the configuration version string in FIG. 3D may also record only a version of one of the two configurations.

Figure 3E:
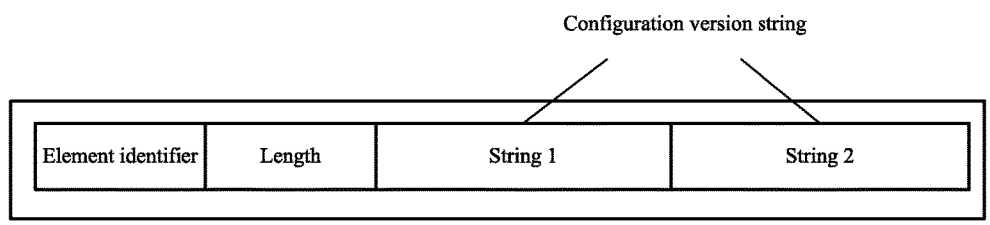

FIG. 3E shows an example of another configuration version string. The example of FIG. 3E aims at two kinds of configuration information. Specifically, as shown in FIG. 3E, an element identifier (Element ID) may be any integer value, from 0 to 255, whose use has not be defined by the 802.11 protocol, and a length (Length) represents the number of bytes corresponding to the configuration version string. The configuration version string includes two strings, namely, a string 1 for the configuration information on the AP and a string 2 for the configuration information on the advertisement server, to record versions of the two configurations.

It should be noted that, although FIG. 3E shows the example where the two configurations correspond to the two strings respectively, the embodiment of the present invention is not limited thereto. The configuration version string may aim at only one of the two configurations, and the number of the corresponding strings may be reduced to one.

Figure 3F:
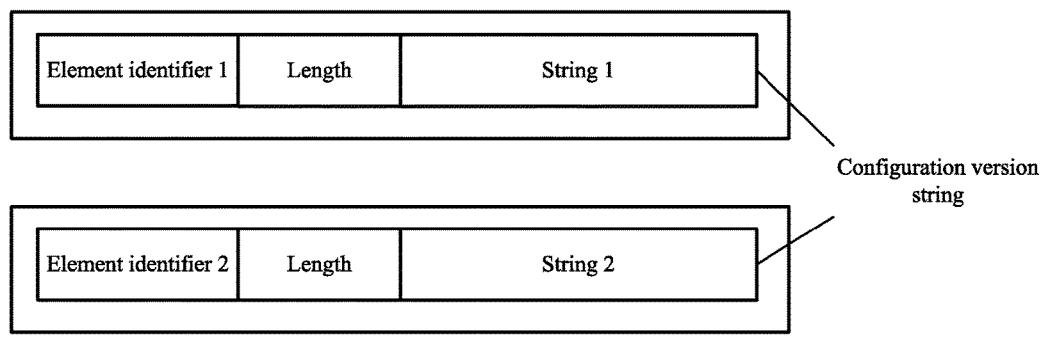

FIG. 3F shows an example of another configuration version string. In the example of FIG. 3F, still for the two kinds of configuration information, but two elements, namely, an element identifier 1 for the configuration information on the AP and an element identifier 2 for the configuration information on the advertisement server, are used to record versions of the two configurations. The two element identifiers (Element ID) may be two different integer values, from 0 to 255, whose use has not be defined by the 802.11 protocol, and a length (Length) represents the number of bytes corresponding to corresponding strings (a string 1 and a string 2).

It should be noted that, although FIG. 3F shows the example where the two configurations correspond to the two elements respectively, the embodiment of the present invention is not limited thereto. The configuration version string may aim at only one of the two configurations, and the number of the corresponding elements may be reduced to one.

The configuration change counter (or the configuration version string) is maintained by a manager of the AP and of the advertisement server. When the manager changes again the configuration information on the AP and/or the configuration information maintained on the advertisement server, the configuration change counter (or the configuration version string) should be synchronously updated so as to be distinguished from a previous configuration.

A configuration change counter information element (or a configuration version string information element) may be carried in the beacon or the probe response of the AP to the station.

The embodiment of the present invention is described in further detail in the following in combination with specific examples, and it should be noted that, the following examples are merely intended to help a person skilled in the art to understand the present invention, but not to limit the scope of the present invention. In addition, in embodiments in FIG. 4 to FIG. 10, the station stores an association record during initial association and uses the stored association record during re-association. However, the embodiment of the present invention is not limited thereto. The association record may be stored after any time when a GAS query is executed, and the stored association record may be used any time when a GAS query is executed subsequently.

Figure 4:
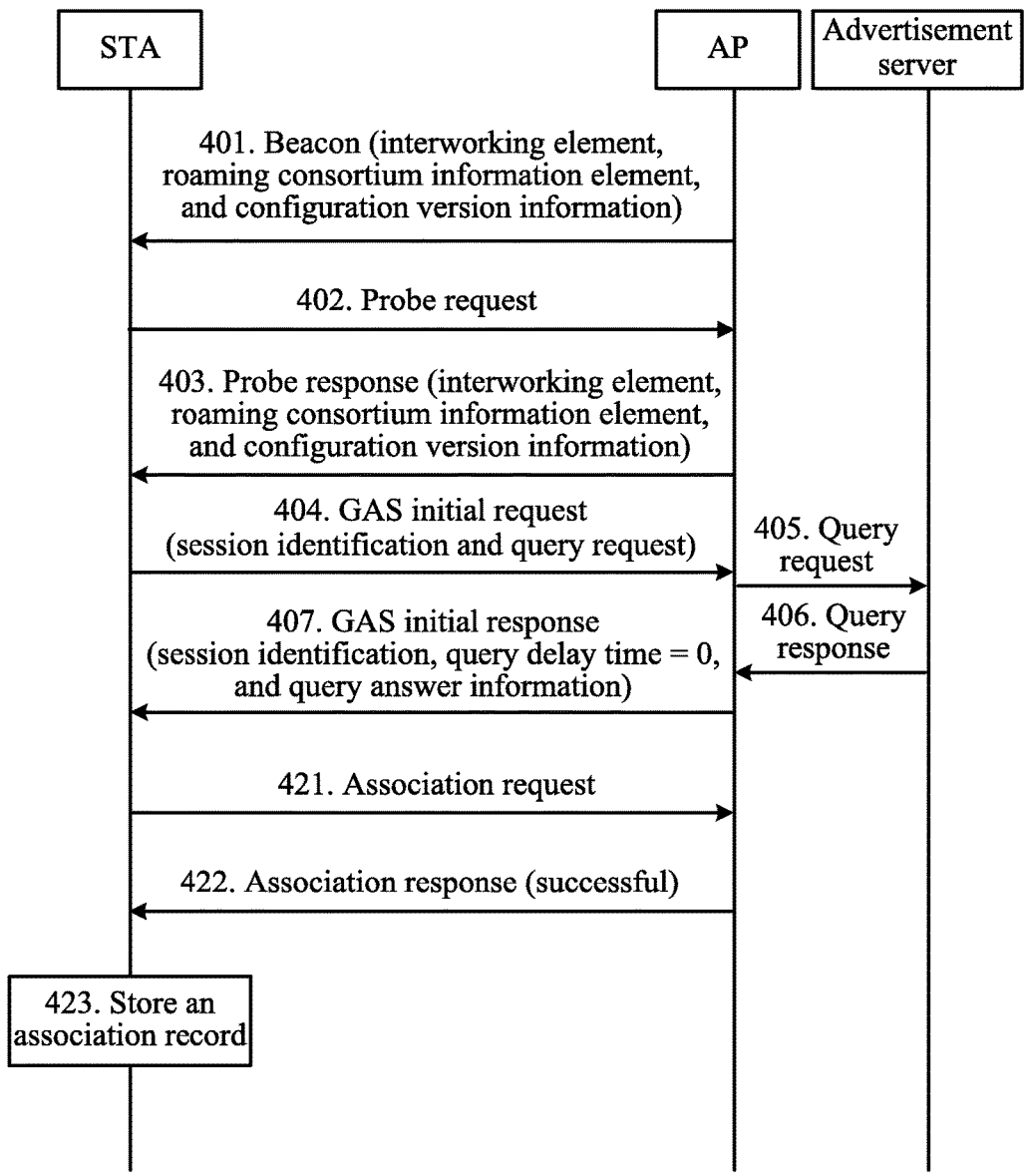
FIG. 4 is a flow chart of an initial access process according to an embodiment of the present invention.

FIG. 4 is a flow chart of an initial access process according to an embodiment of the present invention. In the embodiment in FIG. 4, a STA indicates a station, and an AP indicates an access point. For example, both the STA and the AP can support the 802.11u protocol.

401 to 403: The STA starts a scanning mechanism, discovers the AP through passive scanning (a beacon in step 401) or active scanning (interaction through a probe request in step 402 and a probe response in step 403), and obtains information such as an interworking element, a roaming consortium information element, and configuration version information (for example, the configuration change counter shown in FIG. 3A to FIG. 3C or the configuration version string shown in FIG. 3D to FIG. 3F). In the embodiment in FIG. 4, a beacon in step 401 or a probe response in step 403 may carry the interworking element, roaming consortium information element, and configuration version information.

404: The STA detects that no record of successful association with the AP exists locally, and a GAS query condition is met, and then the STA starts a GAS query mechanism, and sends a GAS initial query request frame to the AP, where the query request frame contains information such as a session identification and a query request.

Content of meeting the condition for executing the GAS query may be described in any of the following cases.

(1) In an association process, the STA cannot identify identification information of an SSP or a group of SSPs represented by all OIs carried in the roaming consortium information element, so that the STA needs to obtain information of additional OIs through the GAS query.

(2) In an association process, although the STA can identify identification information of an SSP (Subscription Service Provider, subscription service provider) or a group of SSPs represented by all OIs carried in the roaming consortium information element, when an additional step required for access field (ASRA: Additional Step Required for Access) in the interworking element (Interworking element) is set to 1 by the AP and the STA does not discover any robust security network (RSN) information element in the beacon or the probe response, the STA needs to obtain related network authentication type information (Network Authentication Type information) through the GAS query so as to perform a next association action.

(3) The STA needs to query information of another external network supported by the AP.

In another aspect, if the GAS query condition is not met, for example, after the configuration is changed, the interworking element/roaming consortium information element in the beacon or the probe response carries information of an OI that can be identified by the STA, and the STA can obtain related authentication information through an RSN information element in the beacon or the probe response, the GAS query does not need to be performed, and steps 404 to 407 are skipped.

405: The AP parses the GAS initial query request frame, and sends the query request contained in the frame to an advertisement server.

406: The advertisement server processes the query request, and returns a corresponding query answer to the AP.

407: The AP returns a GAS initial query response frame corresponding to the GAS initial query request frame to the STA, where the response frame contains information such as the session identification carried in the GAS initial query request frame, query delay time (the query delay time is set to 0 in the example of FIG. 4), and the query answer information.

421 to 422: The STA acquires GAS query information of the AP through the query answer information, and if the STA decides to be associated with the AP, an association action of the STA and the AP is completed through an association request (association request or re-association request) frame (step 421) and an association response (association response or re-association response) frame (step 422). It should be noted that, steps 421 and 422 are merely exemplary, and the association action in the embodiment of the present invention may include more related steps with reference to a corresponding process in the prior art.

423: After the STA is successfully associated, the STA creates a local association record for the AP. The association record may include, but is not limited to, identification information of the AP, a wireless local area network parameter configured on the AP (for example, a parameter related to 802.11u or a vendor specific parameter), and the GAS query information of the AP obtained from the advertisement server in the GAS query process from 404 to 407. For example, the association record may adopt a form of a record table, and each item of the record table includes the foregoing content.

Figure 5:
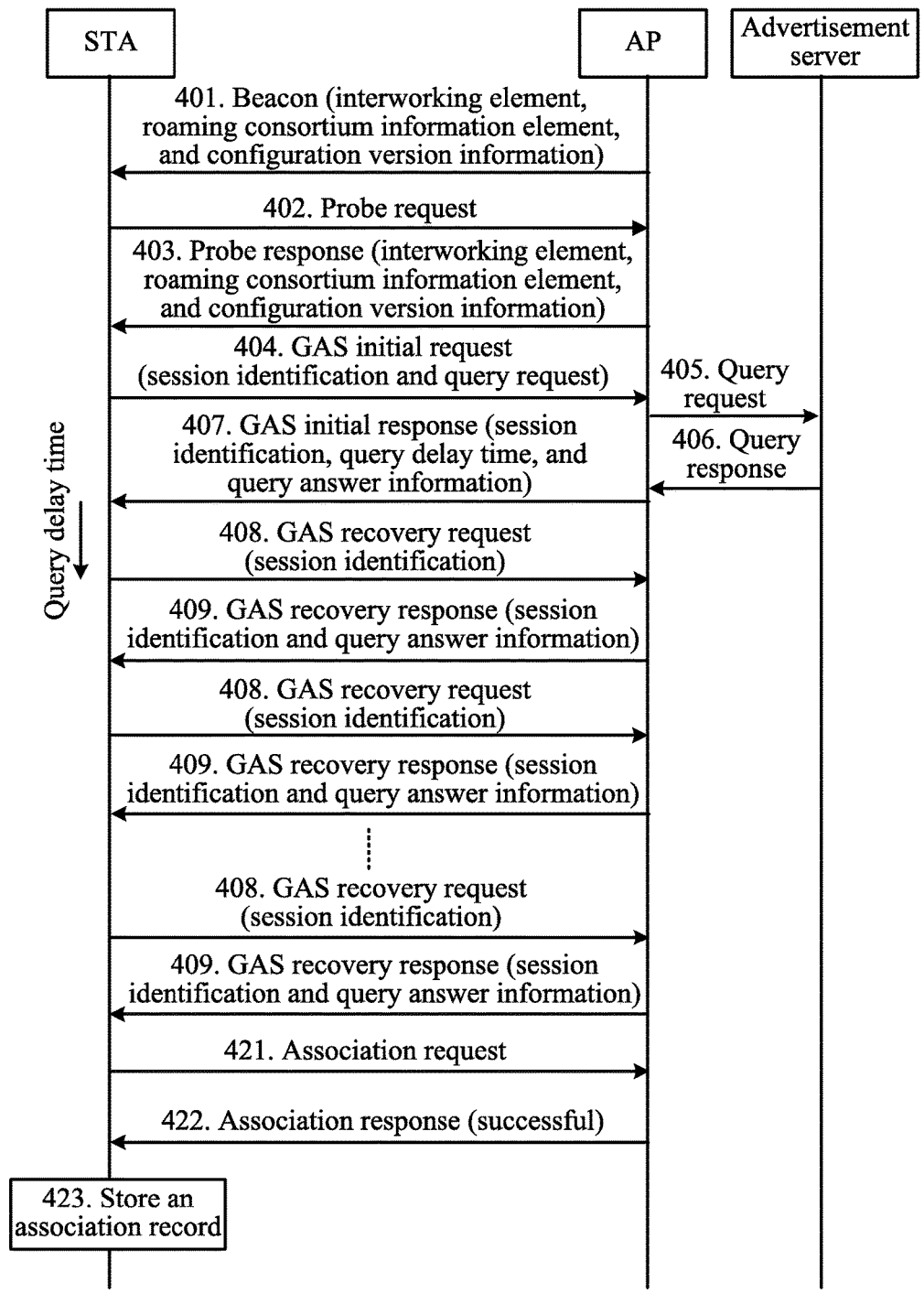
FIG. 5 is a flow chart of an initial access process according to another embodiment of the present invention.

In the embodiment in FIG. 4, a synchronous GAS query process is adopted, and the query answer information does not need to be transferred in fragments. FIG. 5 is a flow chart of an initial access process according to another embodiment of the present invention. In FIG. 5, the synchronous GAS query process is also adopted, but the query answer information needs to be sent in fragments. In the embodiment in FIG. 5, a STA indicates a station, and an AP indicates an access point. For example, both the STA and the AP can support the 802.11u protocol. In addition, the same reference signs are used for the same steps in FIG. 5 as those in FIG. 4, and therefore repeated description is properly omitted.

Differences between FIG. 5 and FIG. 4 are mainly as follows.

The query delay time in 407 is not 0.

408 to 409: As the query answer information is too long, when receiving the GAS initial query response, after the query delay time in step 407, and through a GAS recovery request in step 408, the STA needs to request the AP one or more times to perform transmission in fragments, where the GAS recovery request may carry the session identification, and then the STA receives a GAS recovery response returned by the AP (step 409), where the GAS recovery response carries a corresponding session identification and part of the query answer information, until the query answer information is completely transmitted.

Figure 6:
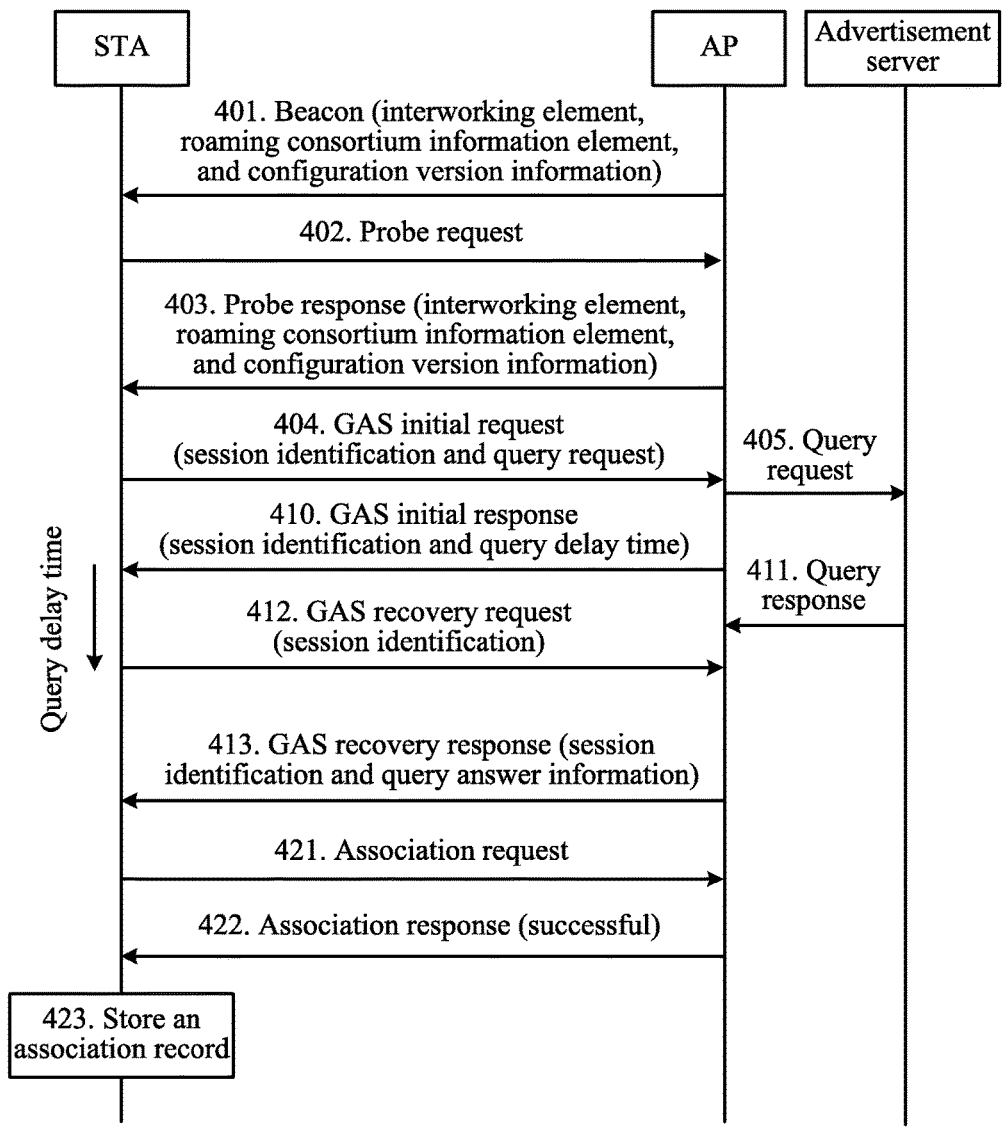
FIG. 6 is a flow chart of an initial access process according to another embodiment of the present invention.

In addition, the embodiment of the present invention may also be applied to an asynchronous GAS query process. FIG. 6 is a flow chart of an initial access process according to another embodiment of the present invention. In FIG. 6, the asynchronous GAS query process is adopted, and the query answer information does not need to be sent in fragments. In the embodiment of FIG. 6, a STA indicates a station, and an AP indicates an access point. For example, both the STA and the AP can support the 802.11u protocol. In addition, the same reference signs are used for the same steps in FIG. 6 as those in FIG. 4, and therefore repeated description is properly omitted.

Differences between FIG. 6 and FIG. 4 are mainly as follows.

404: If the GAS query condition is met, the STA starts the GAS query mechanism, and sends the GAS initial query request frame to the AP, where the query request frame contains the information such as the session identification and the query request.

405: The AP parses the GAS initial query request frame, and sends the query request contained in the frame to the advertisement server.

410: The AP sends a GAS initial query response frame to the STA, and instructs the STA to query information after query delay time.

411: The advertisement server processes the query request, and returns a corresponding query answer to the AP.

412: The STA request previous query information from the AP through a GAS recovery request frame after the query delay time.

413: The AP returns query answer information to the STA through a GAS recovery response. The STA acquires the GAS query information of the AP through the query answer information.

Figure 7:
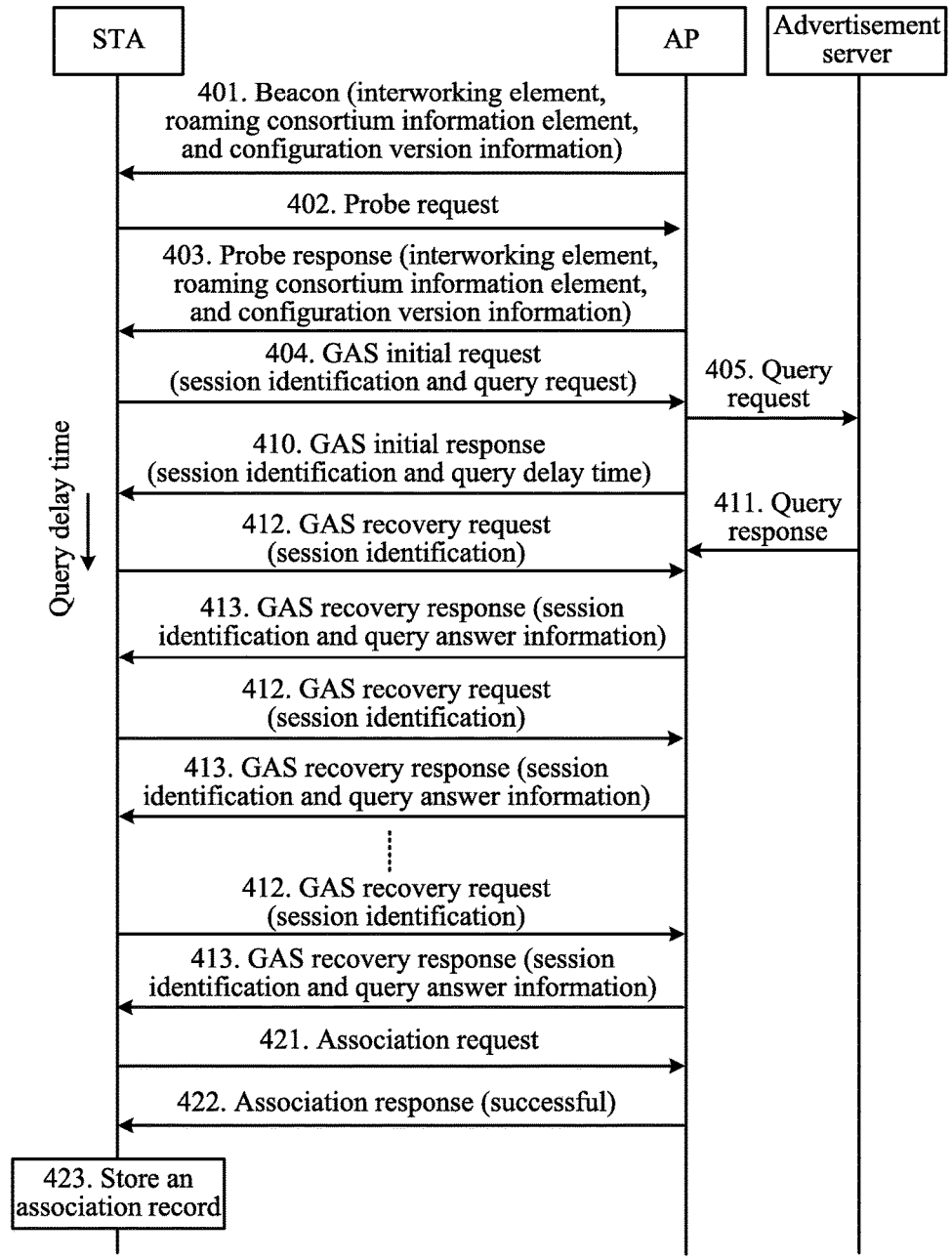
FIG. 7 is a flow chart of an initial access process according to another embodiment of the present invention.

FIG. 7 is a flow chart of an initial access process according to another embodiment of the present invention. In FIG. 7, an asynchronous GAS query process is adopted, but query answer information needs to be sent in fragments. In the embodiment of FIG. 7, a STA indicates a station, and an AP indicates an access point. For example, both the STA and the AP can support the 802.11u protocol. In addition, the same reference signs are used for the same steps in FIG. 7 as those in FIG. 6, and therefore repeated description is properly omitted.

A difference between FIG. 7 and FIG. 6 is mainly as follows.

Steps 412 to 413 are executed one or more times until the query answer information is completely transmitted. The STA acquires the GAS query information of the AP through the query answer information.

Figure 8:
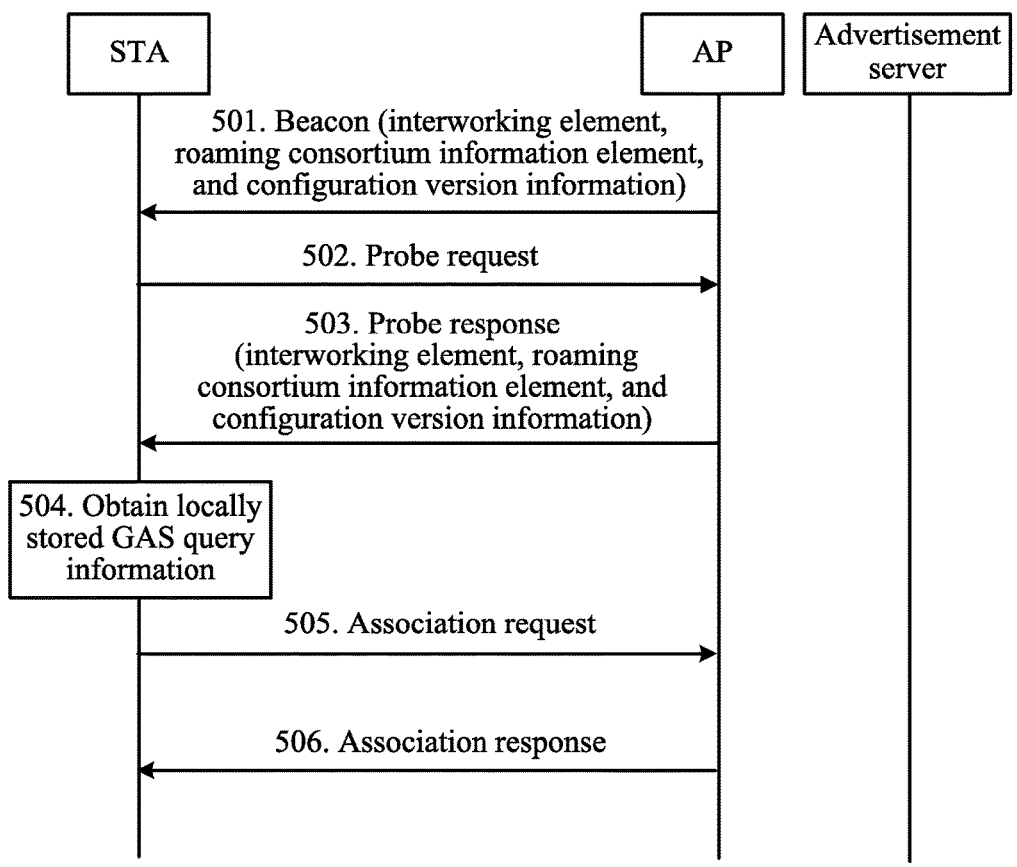
FIG. 8 is a flow chart of a re-access process according to the embodiments in FIG. 4 to FIG. 7.

FIG. 8 is a flow chart of a re-access process according to the embodiments in FIG. 4 to FIG. 7. In the embodiment in FIG. 8, a STA indicates a station, and an AP indicates an access point. For example, both the STA and the AP can support the 802.11u protocol.

501 to 503 are similar to 401 to 403 in FIG. 4, and therefore are not described repeatedly.

504: The STA detects that an association record of successful association with the AP exists, for example, an identification of the AP is consistent with identification information in the association record, and the configuration version information carried in the beacon or the probe response is consistent with configuration version information corresponding to the AP in the association record, the STA obtains previously stored GAS query information locally. In another aspect, if the configuration version information carried in the beacon or the probe response is not consistent with the configuration version information corresponding to the AP in the association record, a GAS query process may need to be executed, so as to obtain the GAS query information from the advertisement server. Alternatively, the needed information may be obtained in other manners (for example, from a modified beacon or probe response).

505 to 506: Similar to 421 to 422 in FIG. 4, if the STA decides to be associated with the AP, an association action of the STA and the AP is completed through an association request frame/association response frame.

After the STA is successfully associated, the STA may not perform update processing on the association record of the AP.

In this way, during a re-association process, it is not necessary to obtain the GAS query information from the advertisement server, thereby increasing an access speed and improving user experience.

Figure 9:
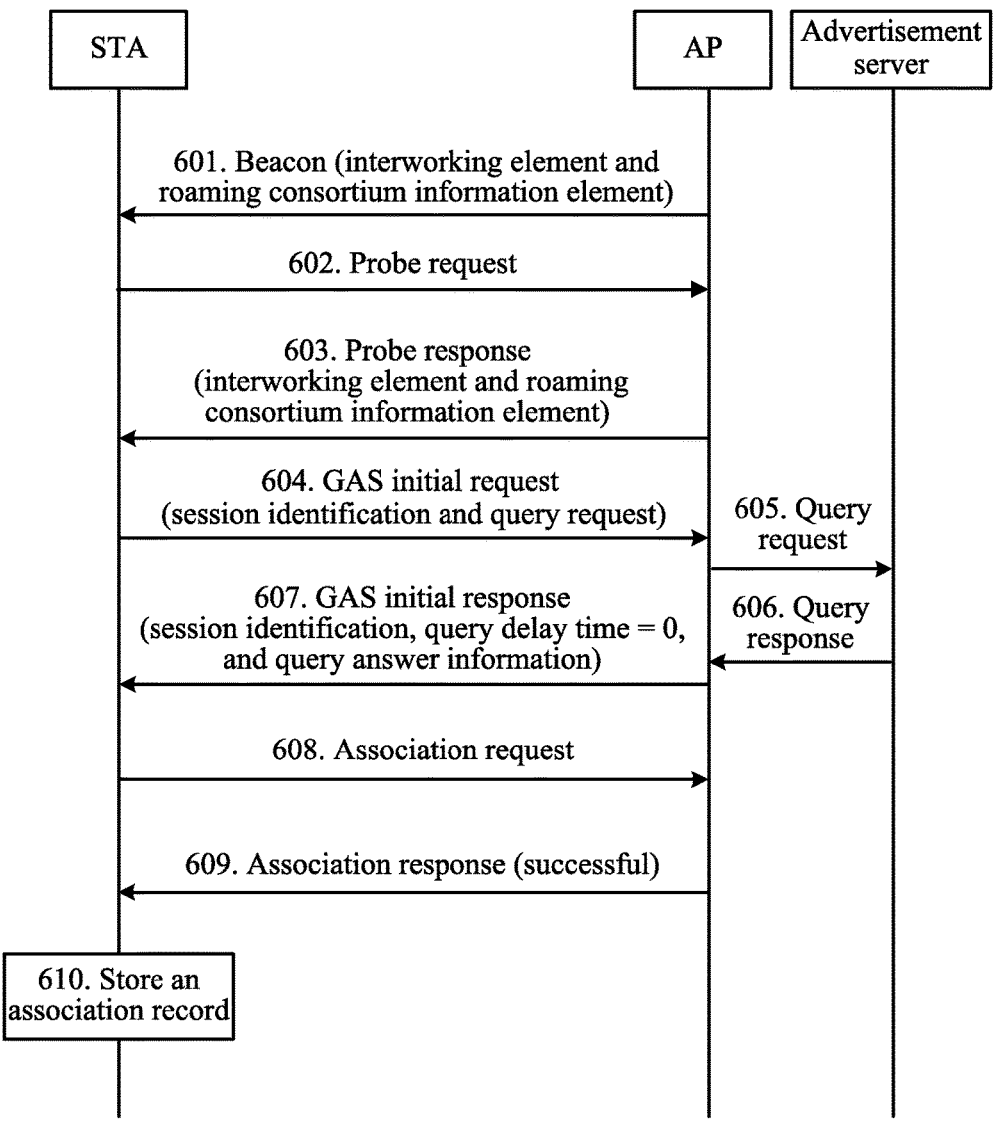
FIG. 9 is a flow chart of an initial access process according to another embodiment of the present invention.

FIG. 9 is a flow chart of an initial access process according to another embodiment of the present invention. In the embodiment of FIG. 9, a STA indicates a station, and an AP indicates an access point. For example, both the STA and the AP can support the 802.11u protocol.

601 to 603: The STA starts a scanning mechanism, discovers the AP through passive scanning (a beacon in step 601) or active scanning (interaction through a probe request in step 602 and a probe response in step 603), and obtains information such as an interworking element and a roaming consortium information element. In the embodiment of FIG. 9, a beacon in step 601 or a probe response in step 603 may carry the interworking element and roaming consortium information element.

604 to 607 are similar to 404 to 407 in FIG. 4 respectively, and therefore are not described repeatedly.

608 to 610 are similar to 421 to 423 in FIG. 4 respectively, and therefore are not described repeatedly.

Similar to FIG. 4, FIG. 9 shows an example where a synchronous GAS query is adopted and query answer information does not need to be transferred in fragments, except that the configuration version information is removed from the beacon or the probe response. However, the embodiment of the present invention is not limited thereto. The processes shown in FIG. 5 to FIG. 7 may also be adopted, and the configuration version information is correspondingly removed from the beacon or the probe response. To avoid prolixity, the process is not described repeatedly.

Figure 10:
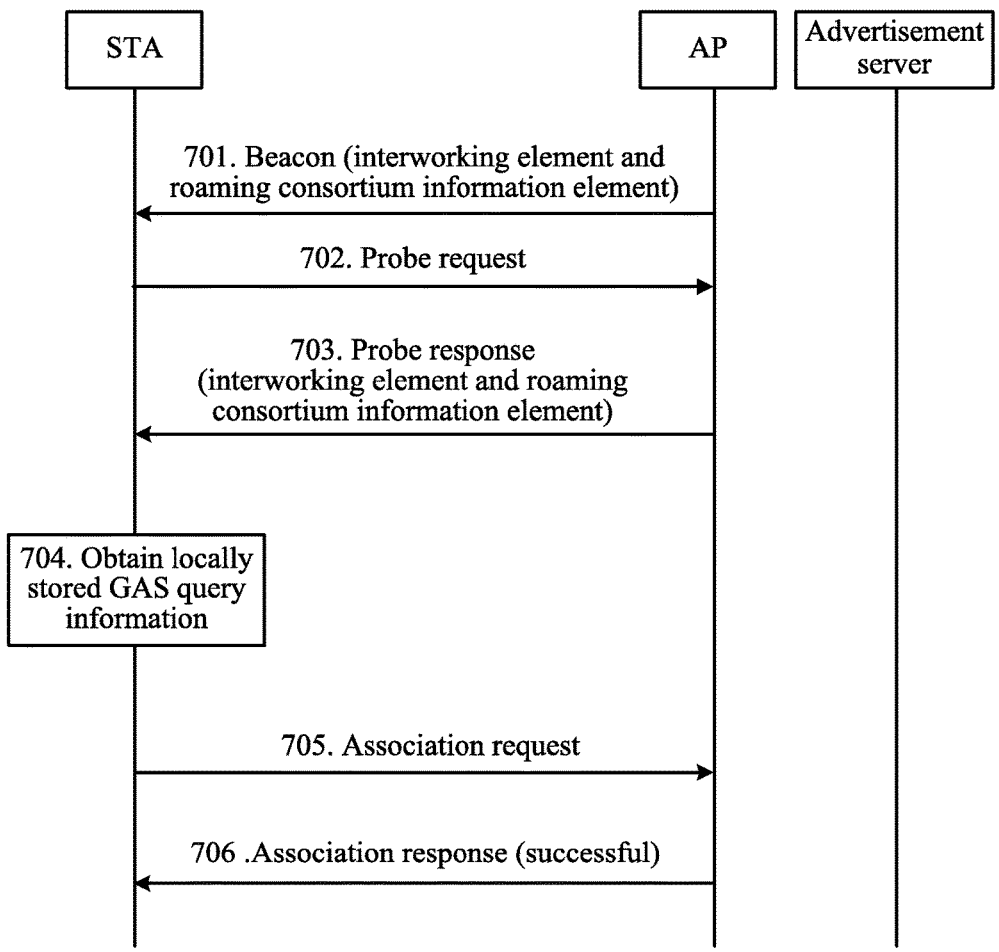
FIG. 10 is a flow chart of a re-access process according to the embodiment in FIG. 9.

FIG. 10 is a flow chart of a re-access process according to the embodiment in FIG. 9. In the embodiment in FIG. 10, a STA indicates a station, and an AP indicates an access point. For example, both the STA and the AP can support the 802.11u protocol.

701 to 703 are similar to 601 to 603 in FIG. 9, and therefore are not described repeatedly.

704: The STA detects that an association record of successful association with the AP exists, for example, an identification of the AP is consistent with identification information in the association record, and then the STA obtains previously stored GAS query information locally.

705 to 706: Similar to 608 to 609 in FIG. 9, if the STA decides to be associated with the AP, an association action of the STA and the AP is completed through an association request frame/association response frame.

After the STA is successfully associated, the STA may not perform update processing on the association record of the AP.

In this way, during a re-association process, it is not necessary to obtain the GAS query information from the advertisement server, thereby increasing an access speed and improving user experience.

In addition, in the embodiments in FIG. 4 to FIG. 10, if updated GAS query information of the AP is obtained, addition or update may be performed on the locally stored association record by using the updated GAS query information.

For example, if the association action of the STA and the AP fails, it indicates that the previously stored association record may not include latest GAS query information. In this case, the STA may perform a GAS query again according to an initial access process (for example, the process in FIG. 4 to FIG. 7 or FIG. 9), to obtain the latest GAS query information.

Alternatively, in step 504 of FIG. 8, if it is discovered that the configuration version information carried in the beacon or the probe response is not consistent with the configuration version information corresponding to the AP in the association record, it indicates that the previously stored association record may have become invalid and cannot be used. In this case, the STA may perform initial association again according to an initial access process (for example, the process in FIG. 4 to FIG. 7 or FIG. 9).

According to the foregoing embodiments of the present invention, an impact on the user experience of the STA caused by time consumption and power consumption of the GAS query process can be reduced to a great extent, and the concept of fast terminal access advocated by an 802.11ai or a hotspot 2.0 wireless local area network is well supported.

Figure 11:
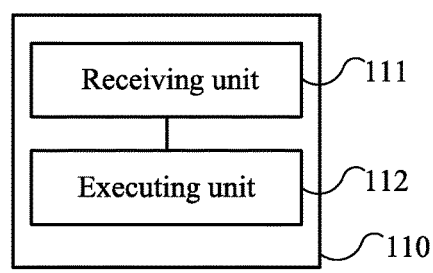
FIG. 11 is a block diagram of a station according to an embodiment of the present invention.

FIG. 11 is a block diagram of a station according to an embodiment of the present invention. An example of a station 110 in FIG. 11 is the STA in FIG. 4 to FIG. 10, and the station 110 includes a receiving unit 111 and an executing unit 112.

The receiving unit 111 receives a beacon or a probe response from an access point, where the beacon or the probe response carries configuration version information. The executing unit 112 executes a GAS query according to the configuration version information carried in the beacon or the probe response.

In the embodiment of the present invention, the access point sends the configuration version information to the station, so that the station executes the GAS query according to the configuration version information without repeating execution of the GAS query every time, thereby reducing unnecessary GAS query processes and improving access efficiency.

Figure 12:
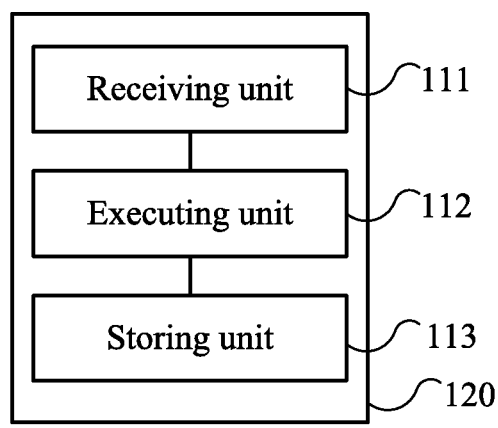
FIG. 12 is a block diagram of a station according to another embodiment of the present invention.

FIG. 12 is a block diagram of a station according to another embodiment of the present invention. A station 120 in FIG. 12 includes the receiving unit 111 and the executing unit 112 in FIG. 11, and further includes a storing unit 113 configured to store an association record for an access point, where the association record includes configuration version information of the access point and GAS query information of the access point that is obtained from an advertisement server in a previous GAS query process.

Optionally, as an embodiment, the association record in the embodiment of the present invention may include GAS query information obtained from the advertisement server during initial association with the access point, but the embodiment of the present invention is not limited thereto. For example, the association record may also include GAS query information, for example, cross-network roaming information, obtained from the advertisement server after successful association (initial association or subsequent association/re-association).

Optionally, as an embodiment, the executing unit 112 may not execute the GAS query when the configuration version information carried in the beacon or the probe response is consistent with the configuration version information included in the association record. For example, the executing unit 112 may create an association request by using locally stored GAS query information, and send the association request to the access point.

Optionally, as another embodiment, the executing unit 112 may execute the GAS query when the configuration version information carried in the beacon or the probe response is not consistent with the configuration version information included in the association record.

Optionally, as another embodiment, the configuration version information may include at least one of the following: a configuration change counter used to indicate a change of configuration information on the access point and/or of configuration information on the advertisement server; and a configuration version string used to indicate a version of the configuration information on the access point and/or of the configuration information on the advertisement server. Reference may be made to FIG. 3A to FIG. 3F for specific examples of the configuration version information, and repeated description is not made again.

Optionally, as another embodiment, the storing unit 113 may store the record for the access point after successful association with the access point.

Optionally, as another embodiment, the association record stored by the storing unit 113 may further include a wireless local area network parameter configured on the access point (for example, a parameter related to 802.11u or a vendor specific parameter).

Optionally, as another embodiment, when updated GAS query information is obtained, the storing unit 113 may further perform addition or update on the association record according to the updated GAS query information.

The station 110 in FIG. 11 and the station 120 in FIG. 12 may execute operations related to the STA in FIG. 1 to FIG. 10, and to avoid repetition, the description is not made again.

Therefore, in the embodiment of the present invention, the access point sends the configuration version information to the station, so that the station executes the GAS query according to the configuration version information without repeating execution of the GAS query every time, thereby reducing unnecessary GAS query processes and improving the access efficiency.

Figure 13:
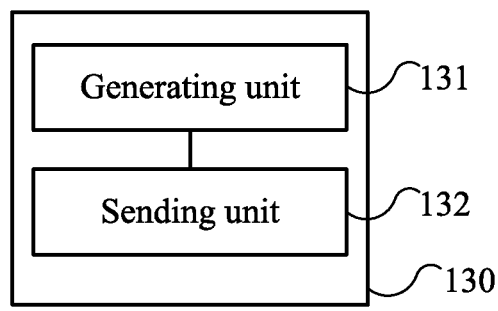
FIG. 13 is a block diagram of an access point according to an embodiment of the present invention.

FIG. 13 is a block diagram of an access point according to an embodiment of the present invention. An example of the access point in FIG. 13 is the AP in FIG. 4 to FIG. 10, and the access point includes a generating unit 131 and a sending unit 132.

The generating unit 131 generates a beacon or a probe response, where the beacon or the probe response carries configuration version information, and the sending unit 132 sends the beacon or the probe response generated by the generating unit 131, so that a station may execute a GAS query according to the configuration version information carried in the beacon or the probe response.

In the embodiment of the present invention, the access point sends the configuration version information to the station, so that the station executes the GAS query according to the configuration version information without repeating execution of the GAS query every time, thereby reducing unnecessary GAS query processes and improving access efficiency.

Optionally, as an embodiment, the configuration version information carried in the beacon or the probe response generated by the generating unit 131 includes at least one of the following: a configuration change counter used to indicate a change of configuration information on the access point and/or of configuration information on an advertisement server; and a configuration version string used to indicate a version of the configuration information on the access point and/or of the configuration information on the advertisement server. Reference may be made to FIG. 3A to FIG. 3F for specific examples of the configuration version information, and repeated description is not made again.

The access point 130 in FIG. 13 may execute operations related to the AP in FIG. 1 to FIG. 10, and to avoid repetition, the description is not made again.

A communication system according to an embodiment of the present invention may include the station 110/120 or access point 130.

Optionally, in the foregoing embodiments, physically, the receiving unit may be a receiver, the sending unit may be a transmitter, and other units such as the executing unit, the storing unit, and the generating unit may be processors.

A person of ordinary skill in the art may be aware that, units and algorithm steps in the examples described in combination with the embodiments disclosed in this document can be implemented by electronic hardware, or a combination of computer software and electronic hardware. Whether these functions are executed by hardware or software depends on particular applications and design constraint conditions of the technical solutions. A person skilled in the art may use different methods to implement the described functions for each particular application, but it should not be considered that such implementation goes beyond the scope of the present invention.

It may be clearly understood by a person skilled in the art that, for the purpose of convenient and brief description, for a detailed working process of the foregoing system, apparatus, and unit, reference may be made to a corresponding process in the method embodiments, and details are not described herein again.

In the embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on multiple network units. A part or all of the units may be selected according to an actual need to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as a separate product, the functions may be stored in a computer-readable storage medium. Based on such an understanding, the technical solutions of the present invention essentially, or the part contributing to the prior art, or part of the technical solutions may be implemented in the form of a software product. The computer software product is stored in a storage medium, and includes several instructions for instructing a computer device (which may be a personal computer, a server, a network device, or the like) to execute all or part of the steps of the method described in the embodiment of the present invention. The storage medium includes: any medium that can store program code, such as a U-disk, a removable hard disk, a read-only memory (ROM, Read-Only Memory), a random access memory (RAM, Random Access Memory), a magnetic disk, or an optical disk.

The foregoing descriptions are merely specific embodiments of the present invention, but are not intended to limit the protection scope of the present invention. Any variation or replacement readily figured out by a person skilled in the art within the technical scope disclosed in the present invention shall all fall within the protection scope of the present invention. Therefore, the protection scope of the present invention shall be subject to the protection scope of the appended claims.

What is claimed is:

1. A method for accessing a wireless local area network, the method comprising:
    storing, by a station, first configuration version information;
    sending, by the station, an initial generic advertisement service (GAS) query to a first access point associated with an external network;
    receiving a GAS response from the first access point;
    sending, by the station, a first association request to the first access point based on the GAS response and receiving a first successful association response from the first access point;
    after receiving the first successful association response, disassociating with the first access point;
    after disassociating with the first access point, receiving, by the station, a beacon or a probe response from a second access point associated with the external network, wherein the beacon or the probe response carries second configuration version information, wherein the second access point is in a service set of access points with the first access point;

determining, by the station, whether the second configuration version information is consistent with the first configuration version information, wherein the first configuration version information comprises a first configuration version string, wherein the second configuration version information comprises a second configuration version string wherein the first configuration version string and the second configuration version string indicate respective versions of a configuration of the external network supported by the first access point and the second access point; and sending, by the station, a second association request to the second access point by using the GAS response without executing another GAS query, in response to the second configuration version information being consistent with the first configuration version information.

2. The method according to claim 1, wherein the method further comprises executing, by the station, a second GAS query, in response to the second configuration version information not being consistent with the first configuration version information.

3. The method according to claim 1, wherein the first configuration version information is comprised in an association record stored at the station, wherein the association record further comprises configuration information of the first access point.

4. The method according to claim 1, wherein the GAS response of the first access point is obtained from an advertisement server in the initial GAS query.

5. The method according to claim 1, wherein the determining comprises:

determining that the second configuration version information is consistent with the first configuration version information in response to the first configuration version string being consistent with the second configuration version string; and determining that the second configuration version information is not consistent with the first configuration version information in response to the first configuration version string not being consistent with the second configuration version string.

6. The method according to claim 1, wherein the first configuration version information and the second configuration version information further comprise an advertisement server configuration change counter or an advertisement server configuration version string, wherein the advertisement server configuration change counter indicates a number of times that a configuration of an advertisement server changes, and wherein the advertisement server configuration version string indicates a version of a configuration of the advertisement server.

7. The method according to claim 1, wherein the GAS query is a second GAS query, and wherein the GAS response is a second GAS response, the method further comprising:

prior to sending the second GAS query, sending a first GAS query to the first access point;

receiving a first GAS response from the first access point, the first GAS response indicating a query delay time; and after a period of time indicated by the query delay time, sending the second GAS query to the first access point, wherein the configuration information includes a roaming consortium information element.

8. A method for accessing a wireless local area network, the method comprising:

receiving, by an access point associated with an external network, an initial generic advertisement service (GAS) query from a first station;

sending a GAS response to the first station;

receiving, by the access point, a first association request from the first station and sending a first successful association response to the first station;

disassociating with the first station;

sending, by the access point, a beacon or a probe response to a second station, wherein the second station comprises first configuration version information received from a second access point associated with the external network stored locally at the second station, wherein the access point and the second access point both belong to a same service set of access points, wherein the beacon or the probe response carries second configuration version information, wherein the first configuration version information comprises a first configuration version string and the second configuration version information comprises a second configuration version string, wherein the first configuration version string and the second configuration version string indicate respective version of a configuration of the external network supported by the access point; and receiving, by the access point, a second association request from the second station and sending a second successful association response to the second station without receiving a further GAS query from the second station, the second station sending the second association request to the access point by using the previously obtained GAS response without executing another GAS query, in response to the second configuration version information that is carried in the beacon or the probe response being consistent with first configuration version information that is stored locally at the second station.

9. The method according to claim 8, wherein the GAS response of the access point is obtained from an advertisement server in a corresponding GAS query process to the advertisement server from the access point.

10. The method according to claim 8, wherein the first configuration version information and the second configuration version information further comprise an advertisement server configuration change counter or an advertisement server configuration version string, wherein the advertisement server configuration change counter indicates a number of times that a configuration of an advertisement server changes, and wherein the advertisement server configuration version string indicates a version of the configuration of the advertisement server.

11. The method according to claim 8, wherein the GAS response is a second GAS response, the method further comprising:

sending a firs GAS response to the first station, the first GAS response indicating a query delay time;

after a period of time indicated by the query delay time, receiving a second GAS query from the first station; and following receiving the second GAS query, sending the second GAS response, wherein configuration information associated with the second GAS response includes a roaming consortium information element.

12. A station, comprising:

a receiver, configured to receive a beacon or a probe response from a second access point associated with an external network, wherein the beacon or the probe response carries second configuration version information;

a memory storing a program; and a processor for executing the program, the program including instructions for:
  storing, in the memory, first configuration version information,
  sending, by the station, an initial generic advertisement service (GAS) query to a first access point associated with the external network, wherein the first access point is in a same service set as the second access point,
  receiving a GAS response from the first access point
  sending, by the station, a first association request to the first access point and receiving a first successful association response,
  after receiving the first successful association response, disassociating with the first access point,
  after disassociating with the first access point, determining whether the second configuration version information is consistent with the first configuration version information, wherein the first configuration version information comprises a first configuration version string, wherein the second configuration version information comprises a second configuration version string wherein the first configuration version string and the second configuration version string indicate respective versions of a configuration of the external network supported by the access point, and
  sending a second association request to the second access point by using the GAS response without executing another GAS query, in response to the second configuration version information being consistent with the first configuration version information.

13. The station according to claim 12, wherein the program includes further instructions for storing, in the memory, the GAS response.

14. The station according to claim 13, wherein the program includes further instructions for executing a second GAS query, in response to the second configuration version information not being consistent with the first configuration version information.

15. The station according to claim 13, wherein the program includes further instructions for storing, in the memory, configuration information of the access point.

16. The station according to claim 12, wherein the GAS response of the access point is obtained from an advertisement server in the initial GAS query.

17. The station according to claim 12, wherein the first configuration version information and the second configuration version information further comprise an advertisement server configuration change counter or an advertisement server configuration version string, wherein the advertisement server configuration change counter indicates a number of times that a configuration of an advertisement server changes, and wherein the advertisement server configuration version string indicates a version of the configuration of the advertisement server.

18. An access point comprising:
  a processor;
  a memory storing a program for execution in the processor, the program comprising instructions for generating a beacon or a probe response, wherein the beacon or the probe response carries second configuration version information; and
  a transmitter configured to:
    send a first generic advertisement service (GAS) response to a first station in response to a GAS query from the first station;
    send a first successful association response to the first station in response to a first association request from the first station,
    disassociate with the first station,
    send the beacon or the probe response generated by the processor to the a second station, and
    send a second successful association response to the second station in response to a second association request from the second station, without receiving a second GAS query, the second station sending the second association request to the access point by using a previously obtained GAS response from a second access point without executing another GAS query, in response to the second configuration version information that is carried in the beacon or the probe response being consistent with first configuration version information that is stored locally by the station, wherein the first configuration version information comprises a first configuration version string and the second configuration version information comprises a second configuration version string, wherein the first configuration version string and the second configuration version string indicate respective version of a configuration of the external network, wherein the access point is in a same service set as the second access point, each being associated with the external network.

19. The access point according to claim 18, wherein the GAS response of the access point is obtained by the access point from an advertisement server in a corresponding GAS query process to the advertisement server from the access point.

20. The access point according to claim 18, wherein the first configuration version information and the second configuration version information further comprise an advertisement server configuration change counter or an advertisement server configuration version string, wherein the advertisement server configuration change counter indicates a number of times that a configuration of an advertisement server changes, and wherein the advertisement server configuration version string indicates a version of the configuration of the advertisement server.

* * * * *

UNITED STATES PATENT AND TRADEMARK OFFICE
CERTIFICATE OF CORRECTION

Page 1 of 1

PATENT NO. : 10,172,074 B2
APPLICATION NO. : 13/911390
DATED : January 1, 2019
INVENTOR(S) : Yao et al.

It is certified that error appears in the above-identified patent and that said Letters Patent is hereby corrected as shown below:

In the Claims

In Column 20, Line 20, Claim 18, delete "to the a second station" and insert --to a second station--.

Signed and Sealed this
Nineteenth Day of March, 2019

Andrei Iancu
*Director of the United States Patent and Trademark Office*